June 24, 1958   H. T. BOOTH ET AL   2,840,068
OIL TANK WITH PRESSURIZED HOPPER
Filed Dec. 20, 1956
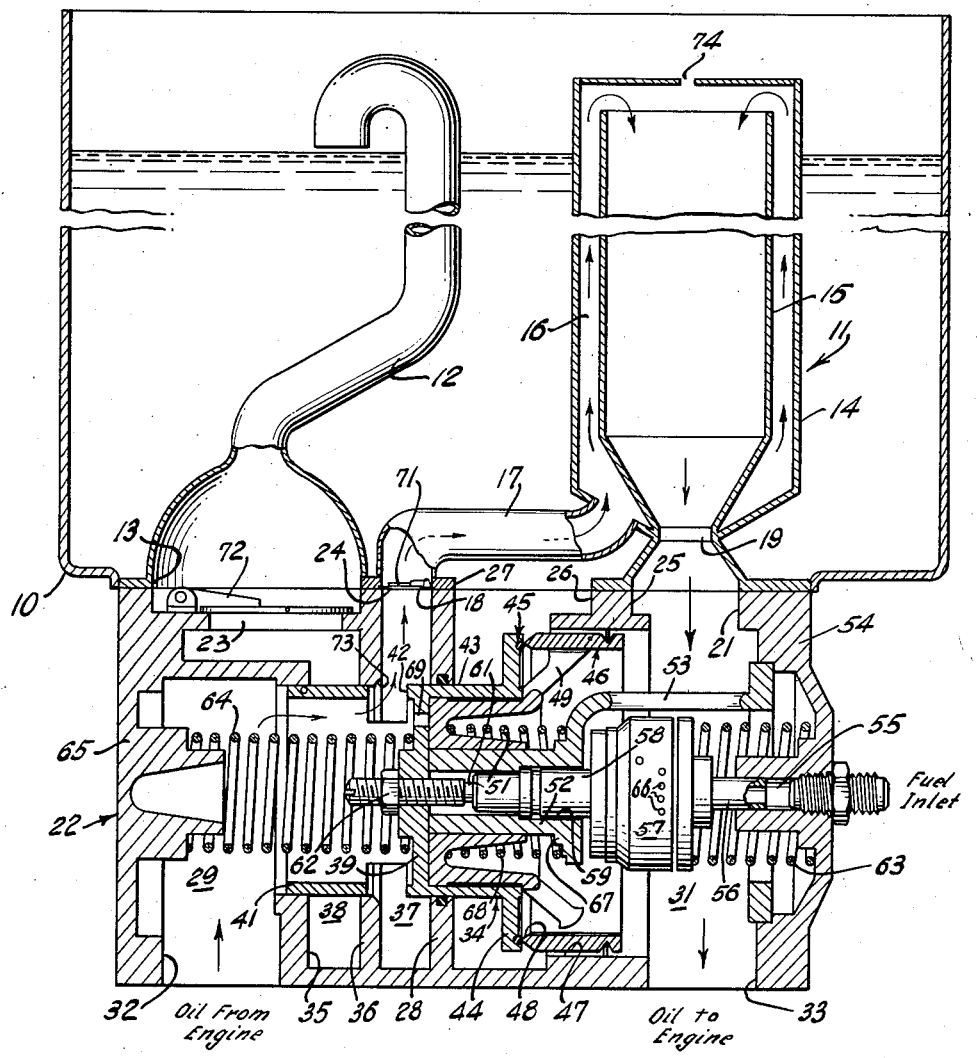
INVENTORS
Harry T. Booth
Thomas J. Lord
Paul R. Hughes
BY
J. E. Beringer
their ATTORNEY

# United States Patent Office 2,840,068
Patented June 24, 1958

2,840,068

OIL TANK WITH PRESSURIZED HOPPER

Harry T. Booth, Dayton, Thomas J. Lord, Middletown, and Paul R. Hughes, Englewood, Ohio, assignors to United Aircraft Products, Inc., Dayton, Ohio, a corporation of Ohio Application December 20, 1956, Serial No. 629,566

10 Claims. (Cl. 123—196)

This invention relates to storage tanks as used in engine lubricant circulating systems, and particularly to such tanks incorporating a hopper whereby the circulating lubricant may flow in by-passing relation to the main body of lubricant in the tank proper.

In engine lubricant circulating systems as described, the lubricating oil may have a flow rate on the order of several hundred pounds per minute. The lower parts of the tank and of the hopper are in common communication with a tank outlet connected by suitable piping for flow of the oil to the engine. The oil returning from the engine is in some systems discharged in whole part and continuously into the upper part of the hopper. In other systems, a principle of diverting is used whereby the major part of the returning oil flow is directed at times to the upper part of the hopper and at other times to the upper part of the tank. In accordance with the first system the circulating oil is at all times directed through the hopper, with the main body of oil in the tank being used for makeup purposes. That is, as oil is lost from the circulating system a replacement quantity is drawn from the lower part of the tank, the arrangement being one in which the hydraulic heads in the hopper and in the tank tend to balance one another.

In a diverting system, during normal running of the engine, the oil flow returning from the engine is directed into the upper part of the tank, exteriorly of the hopper, giving opportunity for more thorough deaeration.

In engine lubricant circulating systems of both types, provision is made for adding a diluent to that part of the lubricant supply which is in circulation in order to reduce the susceptibility of the resulting mixture of oil and diluent to congealing. The dilution process normally is carried out just prior to shutting down of the engine, when the aircraft or other embodiment of the engine is to be permitted to stand idle over a long period of time in very low temperatures. It is, of course, desirable to dilute the smallest possible quantity of lubricating oil in order to conserve diluent, to reduce the time required for dilution to a predetermined percentage, and to reduce the time required for evaporating of the added diluent when the engine is restarted. Accordingly, in the diverting system provision is made for shifting flow from the tank to the hopper in response to or in accompaniment with the adding of the diluent in order that during the dilution period flow through the tank will be by way of the hopper and the main body of oil in the tank will remain undiluted.

Since the lower part of the tank is in free communication with the common tank outlet during dilution it is possible for some of the relatively heavy and dense oil in the tank to flow to the outlet, particularly if the hydraulic head in the hopper should become relatively lower than that in the tank. The result of this may be prolonged dilution to obtain the desired percentage dilution, or may result in the presence of quantities of the relatively heavy and undiluted oil at low points in the circulating system which may congeal and form plugs preventing a free circulation of the oil when the engine is restarted.

It is an object of this invention to obviate any substantial amount of flow out of the tank proper during the dilution process.

It is another object of the invention to accomplish the foregoing by means and in a manner offering no opposition to free flow out of the tank during normal running operation.

The drawing is a view, partly diagrammatic, of a storage tank and oil flow controls in accordance with the illustrated embodiment of the invention.

Referring to the drawing, the invention is in its illustrative embodiment disclosed in a diverting type system wherein flow returning from the engine is shifted from the hopper to the tank and from the tank to the hopper in response to a changing condition of the circulating oil, as for example the temperature thereof. The tank and controls disclosed, except for the feature of the present invention, are the same as those disclosed in Patent No. 2,745,424, issued May 15, 1956, to Frank E. Carroll, Jr. Reference is made to that patent for a disclosure of structure and operation not brought out in all detail herein, as well as for subject matter disclosed herein but not claimed. Reference, for similar purposes, is made also to Patent No. 2,725,069, issued November 29, 1955, to Walter H. Geddes; to Patent No. 2,733,050, issued January 31, 1956, to Harry T. Booth; to Patent No. 2,695,679, issued November 30, 1954, to A. C. Hoffman et al.; and to Patent No. 2,584,877, issued February 5, 1952, to A. C. Hoffman et al.

In the drawing, a tank 10 is indicated diagrammatically as having a generally rectangular shape, closed at its sides and bottom and open throughout its top. In actual practice, the tank may assume any shape indicated or required by the volume of oil it is required to hold and by the space in which it must be accommodated in the engine compartment. The tank is substantially closed, except for the piping connections leading to and from it. The upper part of the tank interior, while not completely open to the atmosphere in the manner illustrated, is connected to the atmosphere or to the engine sump by means imposing no restriction upon the free movement of air and vaporous fluids whereby no opportunity is afforded for such fluids to become trapped within the tank and build up a fluid pressure therein. A hopper, indicated generally at 11 stands upright in the tank, as does a stand pipe 12 which has the function, as will hereinafter more clearly appear, of delivering return oil to the tank interior exteriorly of the hopper. The bottom or lower wall of the tank 10 has an opening 13 with which the lower end of the stand pipe 12 communicates, the pipe extending upward through the body of oil within the tank and terminating above the oil level. The hopper 11 comprises an outer shell 14 and an inner shell 15. The outer shell 14 extends above the normal liquid level in the tank 10 and above the upper end of the inner shell 15. The space between the shells 14 and 15 constitutes an inlet flow passage to the interior of the inner shell 15 and communicates at its lower end with a pipe 16 communicating in its turn with an opening 17 in the bottom of the tank 10. Flow into the hopper 11 is by way of the tank opening 18, pipe 17, passage 16 and thence into the shell 15 through the open top thereof. Within the hopper, the oil descends through the hopper 15 and flows out of the hopper by way of an opening 19 overlying and communicating with an opening 21 in the bottom of the tank 10.

Fastened to the bottom of the tank 10, either directly or through suitable adapter means, is a valve housing 22 having openings 23, 24 and 25 communicating with the respective openings 13, 18 and 21 in the tank 10. Also in the housing 22 is an opening 26 communicating with an opening 27 in the bottom of the shell 10, which latter opening is located outside the hopper 11 and serves as the outlet for oil flow out of the bottom of the tank. The valve housing openings 23 and 24 are separated by an integral partition 28 from the housing openings 26 and 25. The former set of openings communicates with a chamber 29. The latter set of openings communicates with a chamber 31. The chamber 29 in the valve housing is connected through an opening 32 with piping leading from a scavenge pump continuously drawing oil from the engine sump and directing it in a return flow toward the tank. The chamber 31 is connected by way of an opening 33 and suitable piping to a suction or pressure pump by which the oil is delivered under pressure to the places to be lubricated in the engine. The chamber 29 may thus be termed an inlet chamber in relation to the direction of flow through the tank and valve assembly, while the chamber 31 may similarly be termed an outlet chamber. Inlet chamber 29 is in common communication with the stand pipe 12 leading to the interior of the tank and with pipe 17 leading to the hopper 11. The outlet chamber 31 is in common communication with the bottom of the hopper 11 and with the bottom of the tank interior.

Flow out of the chamber 29 to the stand pipe 12 and pipe 17 is controlled by a diverter valve element 34. The element 34 is constructed as an open ended cylinder and has a sliding mounting in the partition wall 28 and in internal housing ribs 35 and 36 in the inlet chamber 29, the rib 36 defining with the partition 28 an annular chamber 37 communicating with the opening 24 in the valve housing and defining with rib 35 an annular chamber 38 communicating with valve housing opening 23. The diverter valve element is centrally partitioned by a vertical wall 39. Extending in one direction from the wall 39 and into the inlet chamber 29 is a cylindrical formation 41 having on its periphery a valve face in which is an opening 42.

In response to longitudinal adjustment of the diverter valve element, the opening 42 is brought selectively to register with the annular chamber 37 or with the chamber 38 or to an intermediate position overlapping the rib 36 in which it communicates with both chambers 37 and 38. The end of cylindrical portion 41 being open, oil entering inlet chamber 29 by way of opening 32 will be directed by the diverter valve element 34 in accordance with the position thereof, either to the annular chamber 37 and thence to the hopper assembly or to the annular chamber 38 and thence to the tank proper, or a part of the flow may go to the chamber 37 and another part to the chamber 38.

Extending in the opposite direction from the wall 39, into the outlet chamber 31, is a cylindrical portion 43 terminating in a radial flange 44 on which is a valve face 45. A segregator valve element 46 is slidably mounted on an internal housing slideway 47 and has a valve face 48 engageable with the valve face 45 on the diverter valve element 34. The segregator element 46 further has a spider portion 49 interconnecting the valve face 45 and a piston 51 received in the cylindrical portion 43 of the diverter valve element, the interior of such latter portion serving as a piston chamber.

Within the portion 43, the piston 51 has a sliding bearing on a tubular projection 52 on a thermostat cage 53. The latter has a mounting in a closure cap 54 at one end of the valve assembly. The closure cap 54 is formed with a central through bore 55, one end of which is adapted to be connected in a diluent supply line and the other end of which receives the shank 56 of a thermostat case 57. A sleeve 58 is connected to the case 57 and projects from the opposite end thereof into a bore 59 in the tubular projection 52 on the cage 53. Within the case 57 is a thermal material having the property of expansion under applied heat. The expansive force is exerted against a plunger 61 which extends through and beyond the sleeve 58, its outer end being threaded into engagement with the partition wall 39 of the diverter valve element 34. The connection so afforded being made secure by a lock nut 62.

The thermostat case 57 is contained in the cage 53 which has openings for free access of the oil in the chamber 31 to the thermostat case, the oil in effect washing the thermostat case as it moves from the interior of the chamber 19 out of the valve housing by way of the opening 33. A relatively strong spring 63 is seated on the closure cap 54 and holds the thermostat case in the position illustrated, overcoming a relatively weaker spring 64 which is seated on an oppositely disposed closure cap 65 of the valve assembly and bears on the partition wall 39. An increasing oil temperature in the chamber 31 heats and expands the thermal material in the case 57. Motion of the case rearward, or to the right as viewed, is inhibited by strong spring 63. Accordingly the expansive force of the thermal material is applied in a direction to extend the plunger 61 outward or to the left, resulting in a shifting of the diverter valve element 34 in the same direction. The spring 64 is utilized to return the diverter valve element in the opposite direction, and to recompress the thermal material in the case 57, in response to a cooling of the oil. The spring 63 will yield in the event of excess or surge pressures in the inlet chamber 29, permitting the diverter valve element and the thermostat mechanism to move as a unit in a rearward or right hand direction.

Diluent introduced into the valve housing by way of the bore 55 in the closure cap 51 flows by way of shank 56 into the interior of the thermostat case 57 where it may contact the thermal material contained therein substantially to the exclusion of the oil. The diluent leaves the case 57 by way of radial openings 66 therein and mixes with the oil leaving the valve housing by way of opening 33. The thermal material in the case 57 is cooled by the diluent with resultant effect upon the diverter valve element irrespective of the temperature of the oil. The diluent is in the illustrated embodiment of the invention liquid engine fuel. It is placed under pressure by pumps supplying the fuel to the engine, and selectively admitted to the lubricant circulating system, as here described, under the control of valve means external to the instant tank and valve combination.

In the segregator valve element construction, a limit shoulder therefor is provided at 67 on the cage 53. A compression spring 68 is interposed between the cage 53 and the segregator element and is effective to urge the element away from the shoulder 67 in a manner to engage the valve face 48 thereon with the valve face 45 on the diverter valve element. With these faces so engaged flow to the outlet chamber 31 by way of the opening 26 is prevented. Motion of the segregator element in the opposite direction against the urging of spring 68 is accomplished by fluid pressure, there being an opening 69 in the partition wall 39 whereby the pressure difference between the inlet chamber 29 and the outlet chamber 31 is applied across the piston portion 51 of the segregator valve element.

The exit ports 18 and 23 are respectively controlled by check valves 71 and 72 spring loaded in a direction and to an extent to prevent flow out of the inlet chamber 29 until a predetermined high pressure differential is achieved between the inlet and outlet chambers sufficient to overcome the spring 68. At all times during engine operation, therefore, makeup oil may pass out of the storage tank and into the circulating oil line.

When the engine oil is unheated and the engine idle, the parts assume the position shown. When the engine is started, the oil returning from the engine enters inlet chamber 29 of the valve assembly and is directed by the diverter valve element 34 to the exit port 18 where it forces check valve 71 open and passes by way of conduit 17 to the hopper assembly. At the same time, as above mentioned, a pressure differential is applied across the segregator element 46 to open a path out of the bottom of the tank for makeup oil. The oil flowing through the hopper assembly is returned to the valve assembly by way of opening 25 therein, being directed by suitable pipe lines back to the engine. As the temperature of the oil so circulated increases, the thermostat mechanism is effective to move the diverter valve element 34 outward or to the left as viewed. This motion is continued until a predetermined temperature value is achieved by which time the opening 42 in the diverter element has moved out of registry with annular chamber 37 and into registry with annular chamber 38. A chamfer 73 provides a means for some oil flow to return through annular passage 37 to the hopper and thence out or back to the valve assembly by way of opening 25. This relatively smaller oil flow acts as an air seal in the hopper. Hence no air will be sucked through the hopper and thence to the engine, causing engine oil pump cavitation.

In the event of dilution, the thermostat is cooled, causing a retraction of the diverter valve element to the position shown wherein the oil flow is returned to the hopper assembly. During dilution, therefore, only a relatively small amount of oil in the system is diluted. Following dilution, the engine usually is shut down. The engine oil is still hot, however, and the thermostat will extend the diverter valve element outward to a normal running position for an interval before it is retracted as the oil cools. Flow of the relatively dense oil in the tank into the system line is precluded in this interval by the segregator element 46, the valve face 48 of which reengages the valve face 45 immediately that the pressure in the system is reduced by shutting off of the engine.

The structure of the hopper 11 is here shown in a diagrammatic form. Openings for filling and the like have been omitted. The top of the hopper is normally closed except for an always open vent opening 74 therein. The opening 74 is predetermined in the size of its area, in relation to the area of hopper outlet 19 and in relation to the quantity flow under maximum and minimum flow conditions, to pressurize the interior of the hopper at certain times and under certain conditions of operation. Thus under full flow (to the hopper) conditions the entrained air and vapors released from the oil are unable freely to escape from the upper part of the hopper by way of opening 74. The result is the building up of an interior pressure which acts on the column of oil in the hopper with a downward force which is additive to the normal head pressure trying to expel the oil downward through the opening 19. Accordingly a force is provided to maintain flow through the hopper, when the segregator valve is set for such flow, even though the hydraulic head pressure of the oil in the hopper may be insufficient to maintain the flow exclusively by way of the hopper. Under low or minimum flow conditions the amount of air and vapor released into the upper part of the hopper is able freely to escape through opening 74 so that there is no pressurizing of the hopper.

The described construction has particular utility in connection with the dilution process, in which it is desired positively to exclude from the circulating system the relatively heavy and undiluted oil in the tank outside the hopper. It has previously been noted that in response to the adding of the diluent the segregator valve adjusts, irrespective of the oil temperature, to direct oil returning from the engine to the hopper. Substantially full flow to the hopper has the result before described of pressurizing the hopper. Flow into the chamber 31 of the valve is thus by way of hopper outlet 19 substantially to the exclusion of the tank outlet 27 since the pressure difference between the upper part of the hopper and chamber 31 is at least as great or greater than the pressure difference between chamber 31 and the tank proper, as defined by the head pressure therein.

The opening 74 places a limitation on the overflow of excess volume liquid from the upper part of the hopper, which overflow may also escape from the circulating hopper system by backing up into the tank by way of openings 26—27. Since there is a possibility of surge pressures, particularly under cold start conditions, a relief valve, for example a flapper valve like the valves 71 and 72, may be installed in the upper part of the hopper and arranged to yield to internal pressures within the hopper above a predetermined value. The opening 74 could be a part of such valve or separate therefrom.

In connection with the creating of pressures in the system, it will be understood that the circulating of the oil is by engine driven pumps, the pump delivering oil to the engine exerting a suction force on the valve chamber 31.

What is claimed is:

1. In an engine lubricant circulating system, a storage tank holding a lubricant supply, a hopper in said tank through which lubricant from the engine may be circulated in by-passing relation to the main body of lubricant in the tank proper, an outlet in common communication with the lower parts of the tank proper and said hopper, and means for pressurizing said hopper to maintain a pressure difference between said hopper and said outlet in excess of the pressure difference between the tank proper and said outlet.

2. In an engine lubricant circulating system, a storage tank holding a lubricant supply, a hopper in said tank to which the greater part of the lubricant returning from the engine is directed during at least a part of the time, an outlet in common communication with the lower parts of the tank proper and said hopper, and means restricting the escape of vaporous fluids from said hopper in a manner to raise the pressure difference between said hopper and said outlet relatively to the pressure difference between the tank proper and said outlet during the time the said greater part of the lubricant is directed to said hopper.

3. An engine lubricant circulating system according to claim 2, characterized in that said last named means comprises a closure for the upper part of the hopper having therein a vent opening of relatively small size.

4. In an engine lubricant circulating system, a storage tank holding a lubricant supply, means for venting the upper part of said tank in a manner substantially to preclude the formation of vapor pressures therein above the liquid level of the lubricant, a hopper in said tank closed at its upper end except for restricted venting, and an outlet in common communication with the lower parts of the tank and hopper, the pressure difference between said hopper and said outlet exceeding the pressure difference between said tank and said outlet during periods of substantial release of vaporous fluids in said hopper.

5. In an engine lubricant circulating system, a storage tank holding a lubricant supply and a hopper therein, the circulating lubricant being returned at least a part of the time to said hopper, means for adding a diluent to the circulating lubricant, the diluted lubricant being heated in its passage through the engine and releasing vapors as it is discharged into said hopper, an outlet in common communication with the lower parts of said tank and said hopper, and means effective during the dilution process to create a greater pressure difference between said hopper and said outlet than exists between said tank and said outlet.

6. An engine lubricant circulating system according to claim 5, characterized in that said last named means comprises a closure for the upper part of said hopper restricting escape of the vapors therein in a manner to raise the pressure in the upper part of said hopper relatively to the upper part of said tank.

7. In an engine lubricant circulating system having a lubricant storage tank, a hopper therein, an outlet in common communication with the lower parts of said tank and said hopper, means for adding a diluent to the circulating system, and means for circulating the lubricant through said hopper in by-passing relation to the tank during addition of the diluent; characterized by means responsive to circulation of the diluted lubricant through said hopper for obtaining a pressure difference between the upper part of said hopper and said outlet greater than the pressure difference between said tank and said outlet.

8. An engine lubricant circulating system according to claim 7, wherein said last named means comprises a closure for the upper part of said hopper providing a predetermined restricted vent for escape of vaporous fluids released from the diluted lubricant.

9. In an engine lubricant circulating system having a lubricant storage tank, a hopper therein, an outlet in common communication with the lower parts of said tank and said hopper, means for adding a diluent to the circulating system, and means for circulating the lubricant through said hopper in by-passing relation to the tank during addition of the diluent; characterized by means restricting the escape from the upper part of said hopper of vaporous fluids released from the diluted lubricant to obtain a pre-determined pressure difference between the upper part of said hopper and said outlet.

10. In an engine lubricant circulating system having provision for adding a diluent to the circulating lubricant, a storage tank, a hopper therein the upper part of which is vented in a relatively restricted manner, an outlet in common communication with the lower parts of said tank and said hopper, and means for directing substantially the whole of the circulating volume of lubricant returning from the engine during dilution to the hopper, vaporous fluids released in the hopper providing in conjunction with the restricted vent therefrom a pressure which when added to the hydraulic head of the lubricant in the hopper is sufficient substantially to preclude flow from the tank to said outlet.

References Cited in the file of this patent

UNITED STATES PATENTS

| | | |
|---|---|---|
| 2,435,359 | Landis | Feb. 3, 1948 |
| 2,584,877 | Hoffman | Feb. 5, 1952 |
| 2,614,575 | Jensen | Oct. 21, 1952 |